May 12, 1953 G. WHITE 2,637,951
SHEET EDGING APPARATUS
Filed May 4, 1950 10 Sheets-Sheet 1
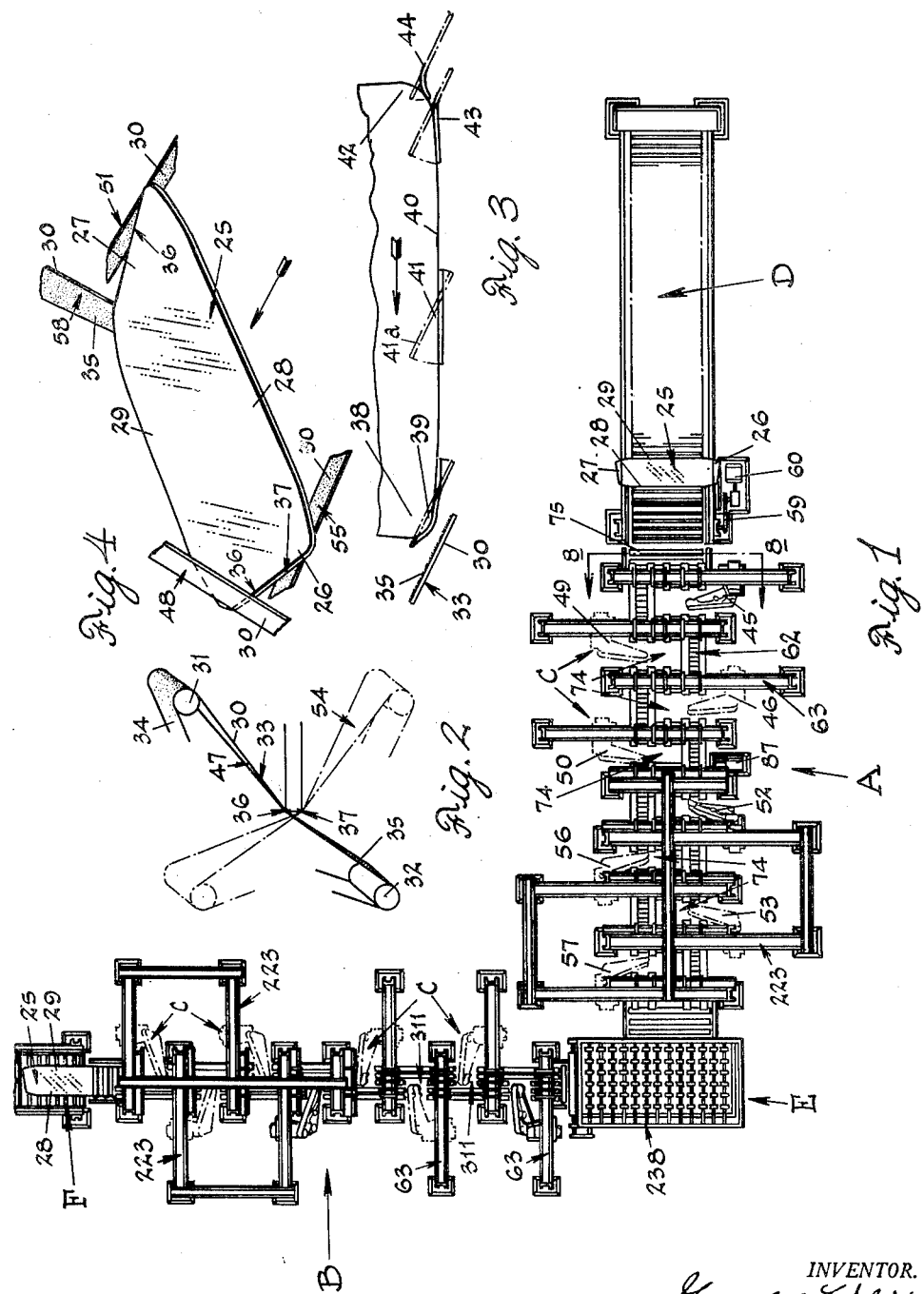
INVENTOR.
Gerald White
BY
Nobbe & Swope
ATTORNEYS

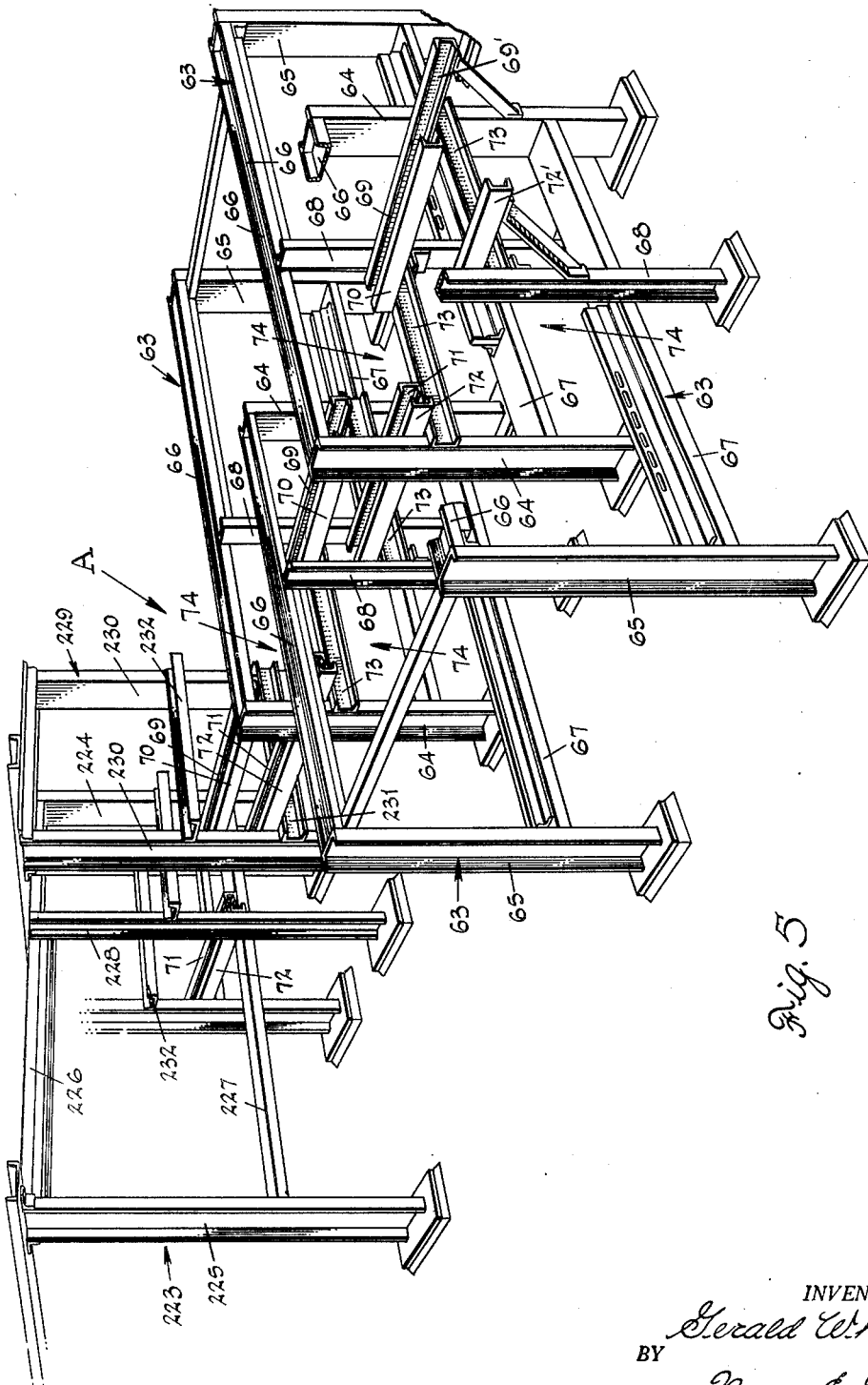

INVENTOR.
Gerald White
BY
Nobbe & Swope
ATTORNEYS

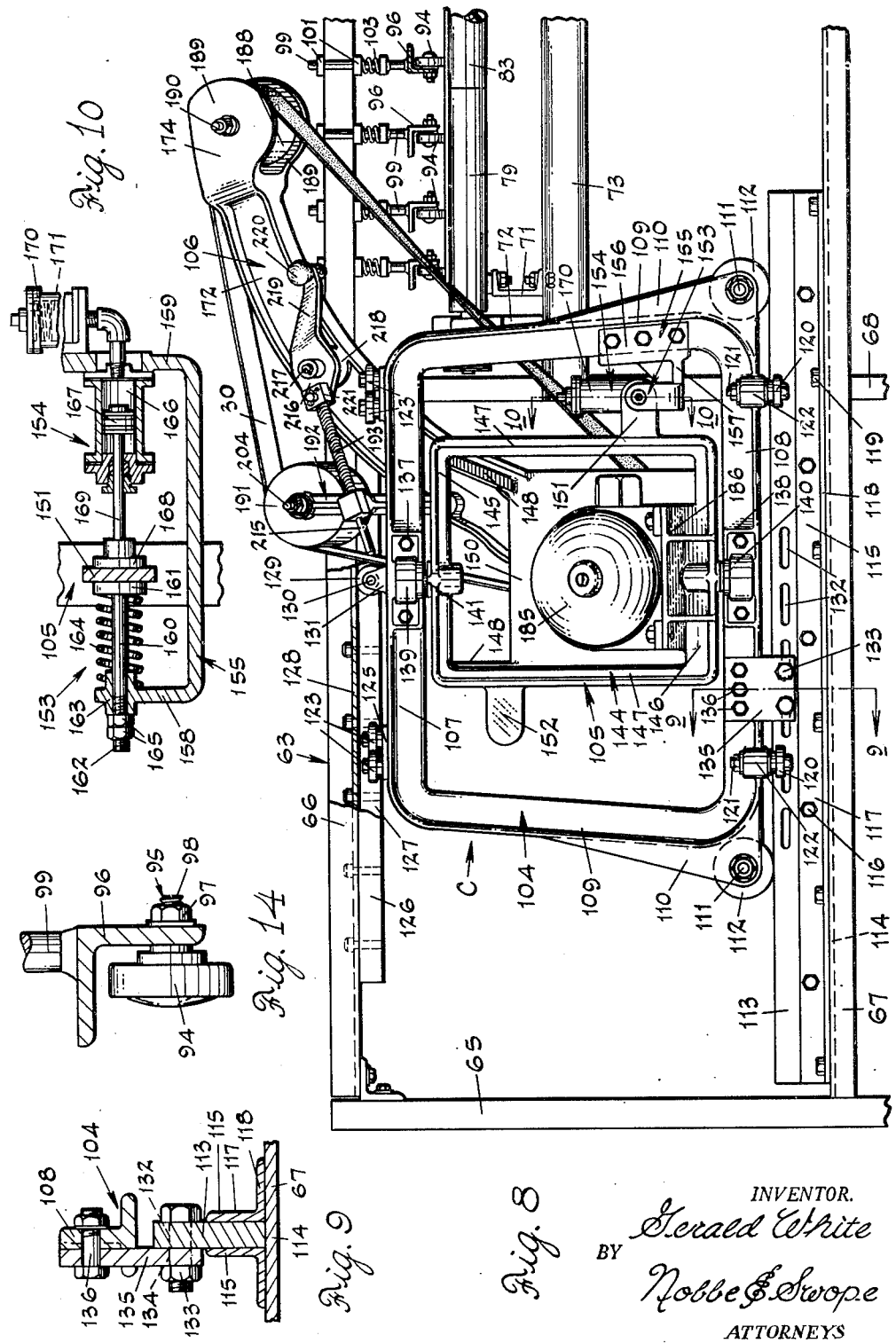

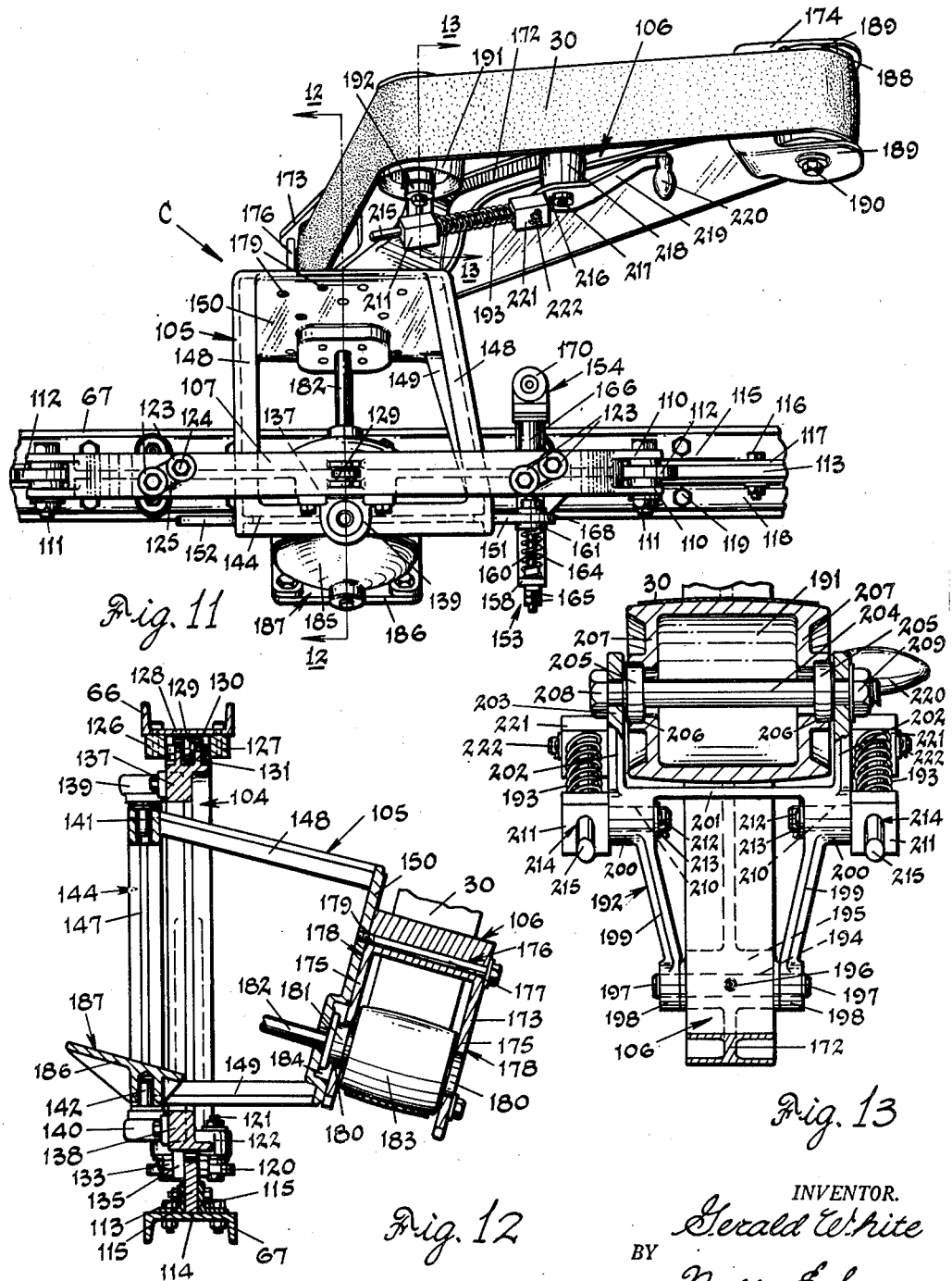

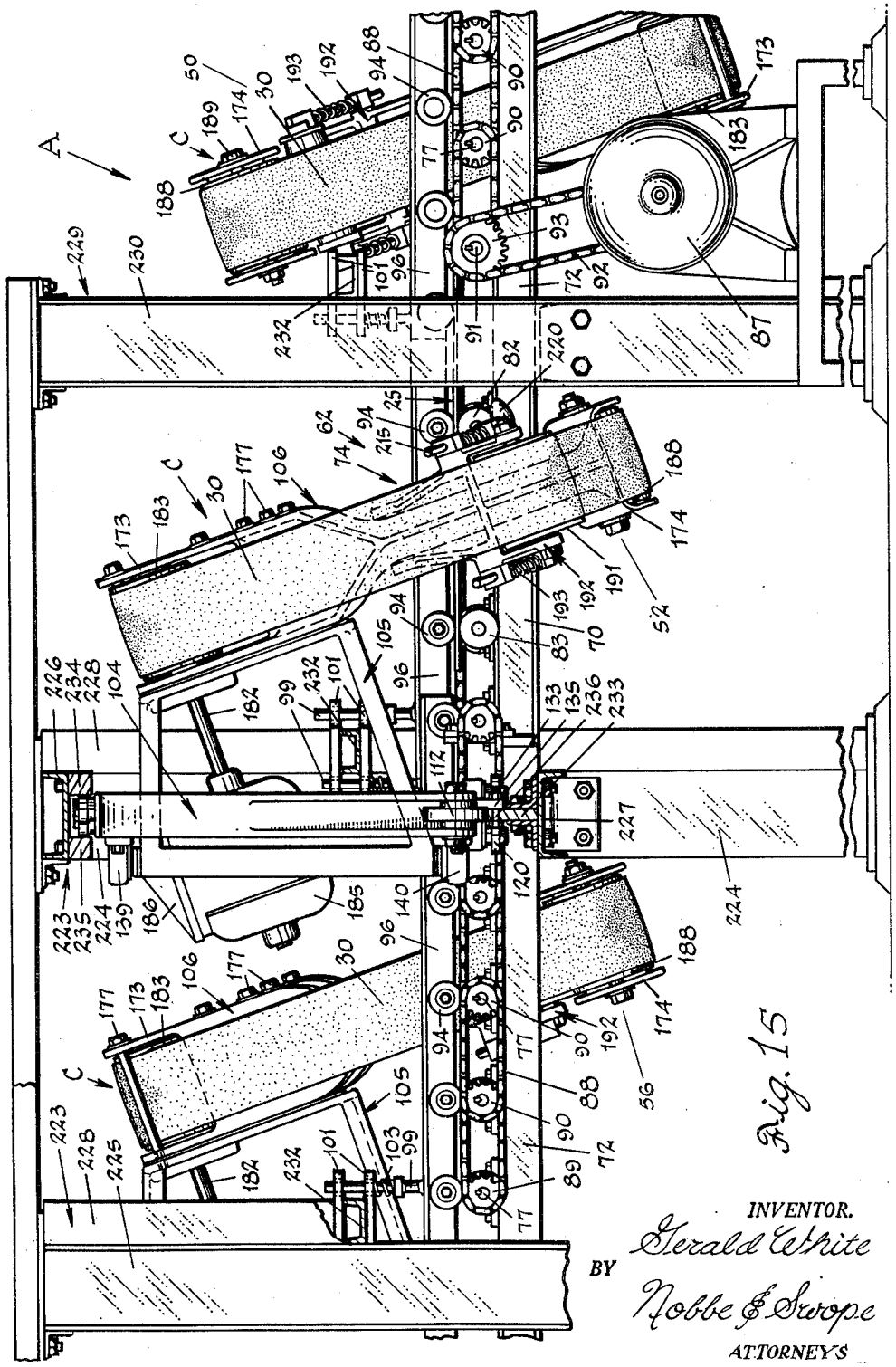

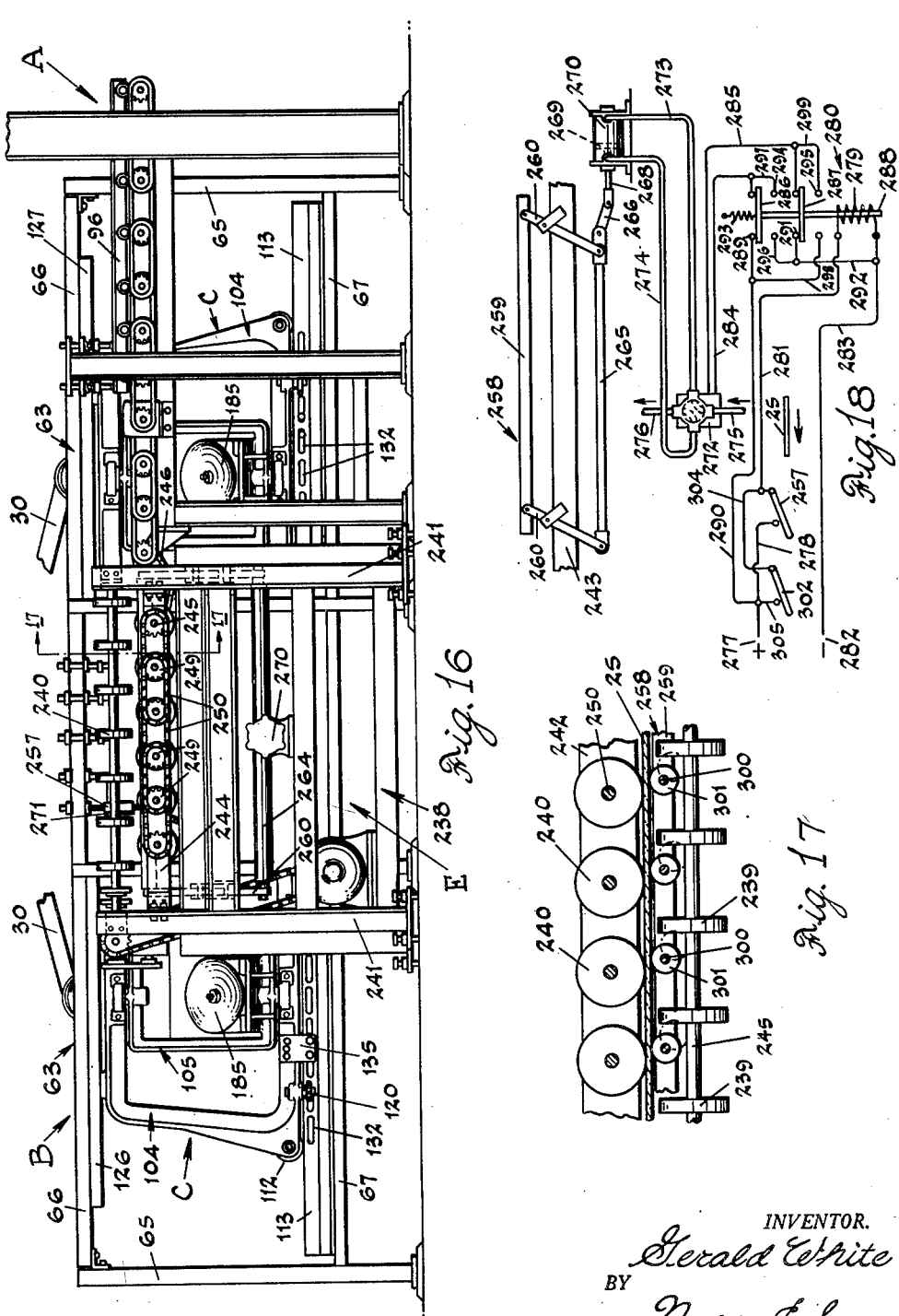

May 12, 1953  G. WHITE  2,637,951
SHEET EDGING APPARATUS
Filed May 4, 1950  10 Sheets-Sheet 8

INVENTOR.
Gerald White
BY
Nobbe & Swope
ATTORNEYS

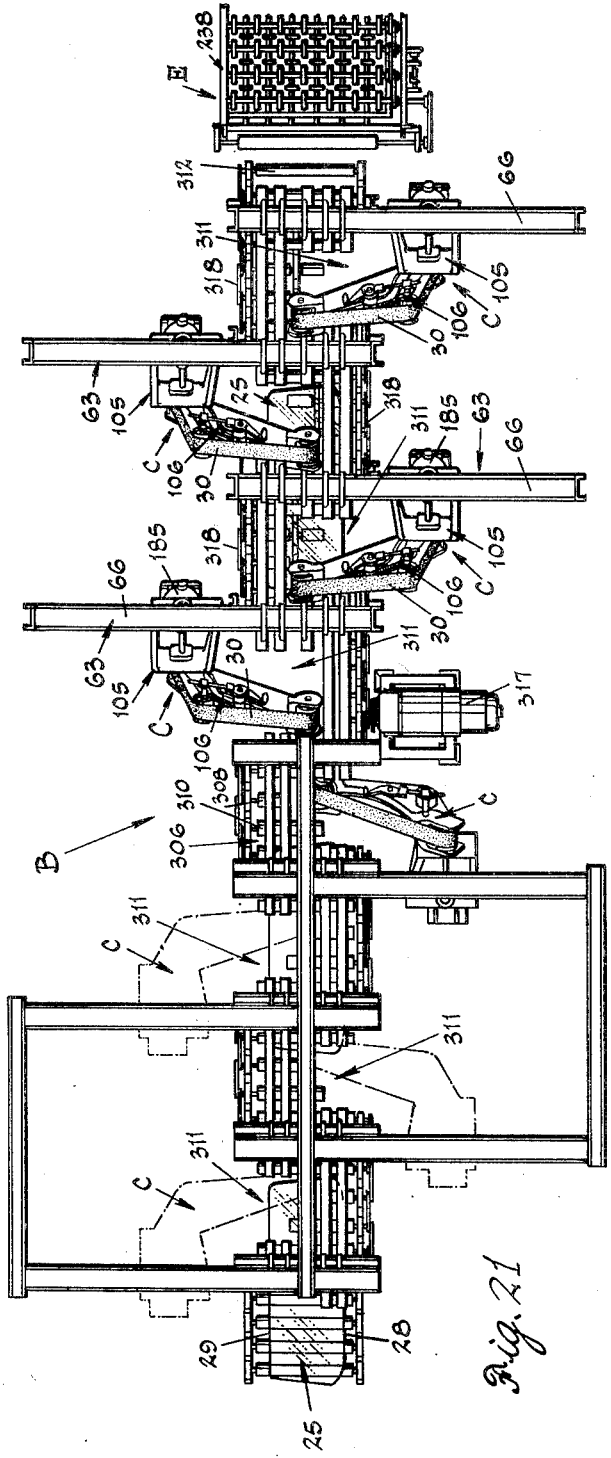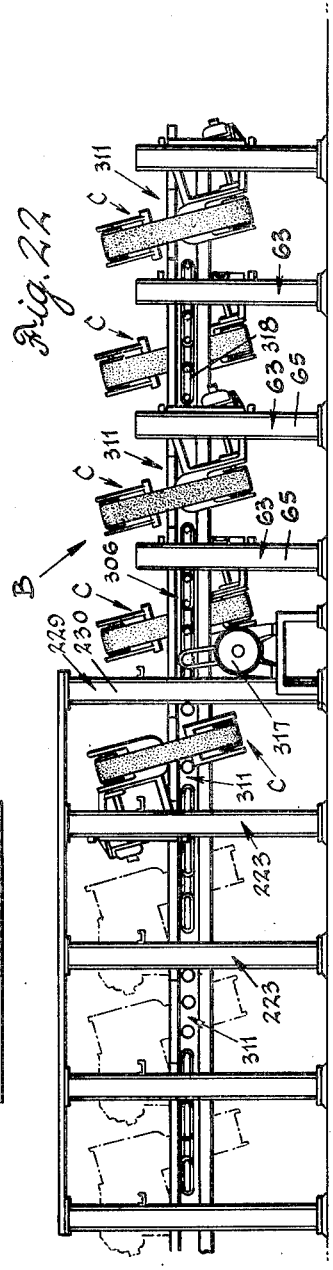

May 12, 1953 G. WHITE 2,637,951
SHEET EDGING APPARATUS
Filed May 4, 1950 10 Sheets-Sheet 10

INVENTOR.
Gerald White
BY
Nobbe & Swope
ATTORNEYS.

Patented May 12, 1953

2,637,951

UNITED STATES PATENT OFFICE 2,637,951

SHEET EDGING APPARATUS

Gerald White, Rossford, Ohio, assignor to Libbey-Owens-Ford Glass Company, Toledo, Ohio, a corporation of Ohio Application May 4, 1950, Serial No. 159,941

11 Claims. (Cl. 51—140)

The present invention relates broadly to the edge treating of sheets of plates of materials such as glass. More particularly, it has to do with a novel form of glass edging apparatus which employs a driven belt type of grinding or abrasive tool.

The invention is based on the discovery that by providing a readily flexible abrasive belt for this purpose, and by properly positioning the moving belt in, and diagonally of, the path of travel of the edge of a glass sheet to be treated, the flexible belt will, as the edge of the sheet moves into contact therewith, conform to and follow even an edge of surprisingly irregular longitudinal contour, to uniformly grind the same, from one end to the other; and further, that when two adjoining side edges of a sheet are successively moved past and in contact with a driven, flexible belt arranged in this manner to edge the same, the moving belt will be found to have ground, not only the two side edges, but also the entire length of the edge areas of the corner portions which connect them.

It is therefore an important aim of the invention to provide an improved form of belt grinder type edging device that is particularly well adapted for treating the edges of sheets and plates of large size and irregular outline, and which is designed to grind the entire length of one side edge, and a portion of the lengths of both adjoining corner edge areas, in one pass of the sheet over the edging tool.

Another object is the provision of a complete edge treating apparatus employing a plurality of edge treating units of the above character that are arranged in a manner to rapidly and expeditiously treat the complete peripheral edge of a sheet or plate in an automatic and substantially continuous manner.

Another object is to provide, in such an edging device, an improved means for supporting the flexible, abrasive belt in a manner, and in a location, that contact with the moving glass sheet to be edged will produce a flexing of the belt to urge it into conformity with the longitudinal contour of the adjacent glass edge, and with the leading and following corner edge areas thereof.

Another object is the provision of a belt mounting means of this character which can be reversed and used interchangeably, at different work points throughout a complete edge treating apparatus, for positioning abrasive belts to grind either upper or lower longitudinal corners at either one of two opposite sides of a moving sheet.

Another object is to provide a mounting of this kind that is movable toward and away from the work to be treated, and which permits swinging movement of the belt, in the plane of the work, to change the angle at which the abrasive face of the unflexed portion of the belt is presented to the work.

Still another object is the provision of a complete edge treating apparatus of the above character wherein a sheet or plate of glass is supported and carried forwardly in a horizontal plane first into engagement with a series of belt type grinding elements arranged in sequential alternate relation for grinding elements arranged in sequential alternate relation for grinding the upper and lower longitudinal corners of two opposite edges of said sheet, then shifted and again carried forwardly in a horizontal plane to engage a second series of belt type grinding elements which are positioned to grind the upper and lower longitudinal corners of the remaining two side edges; and wherein the combined action of the two series of grinding elements will provide an overlap edge finish on the corner areas connecting the side edges of the glass sheet.

Other objects and advantages of the invention will become more apparent during the course of the following description, when taken in connection with the accompanying drawings.

In the drawings, wherein like numerals are employed to designate like parts throughout the same:

Fig. 1 is a top plan view of a complete glass edge treating apparatus embodying the features of the invention;

Fig. 2 is a fragmentary, diagrammatic, transverse sectional view through one margin of a glass sheet being operated upon by one of the belt type grinding tools of the invention, showing two different angles at which the length of the working run of the belt can be arranged with relation to the plane of the glass;

Fig. 3 is a fragmentary plan view of a side margin of a glass sheet being edged according to this invention, showing the width of the working run of the belt arranged in, and diagonally of, the path of travel of the edge areas to be treated, and also showing the action of the flexible abrasive belt as it engages various areas along the side, and adjoining corner, edges of the sheet;

Fig. 4 is a perspective view of a cut size of glass sheet, showing the different operative positions, with relation to the sheet, of the several belts used in seaming glass sheets in accordance with the invention;

Fig. 5 is a perspective view of the skeleton framework upon which the operative elements of one section of the edge treating apparatus are mounted;

Fig. 8 is a side elevation of one of the edge treating units of the apparatus, taken substantially along the line 8—8 of Fig. 1;

Fig. 9 is a vertical transverse section through the locking device for the carrier cradle of one of the edge finishing units, taken substantially on the line 9—9 of Fig. 8;

Fig. 10 is a vertical transverse section through the pressure control devices for restricting the swinging movement of the motor from the edge finishing unit, taken substantially along the line 10—10 of Fig. 8;

Fig. 11 is a top view of the edge treating unit of Fig. 8;

Fig. 12 is a vertical transverse section taken on line 12—12 of Fig. 11;

Fig. 13 is a vertical, transverse section taken on line 13—13 of Fig. 11 and showing the belt tensioning device;

Fig. 14 is a side elevation of a form of pressure roller used throughout the supporting and conveying structure;

Fig. 15 is a fragmentary side elevation of one section of the edge treating apparatus on an enlarged scale;

Fig. 16 is an end view of the transfer section of the apparatus, showing its position relative to the edge finishing sections thereof;

Fig. 17 is a fragmentary, detail sectional view of the transfer unit taken substantially on line 17—17 of Fig. 16;

Fig. 18 is a diagrammatic view of the control system for operating the transfer unit;

Fig. 21 is a top plan view of the second edge treating section of the apparatus;

Fig. 22 is a side elevation of the second edge treating section;

Figure 6:
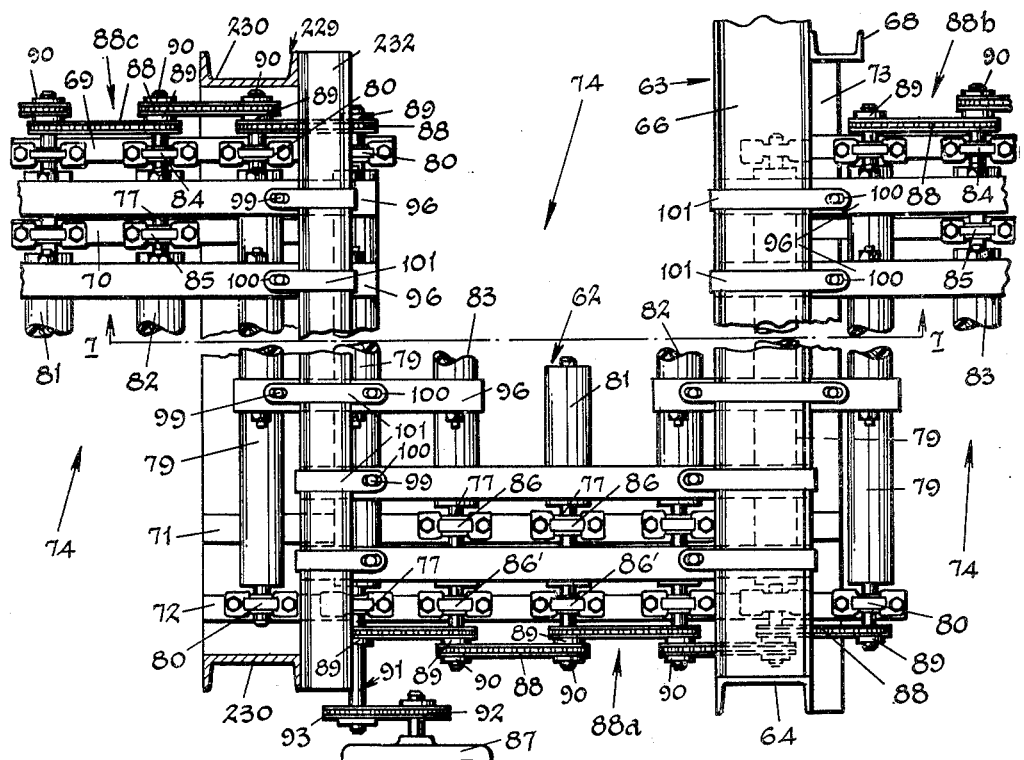
Fig. 6 is a fragmentary detail view of the glass supporting and conveying structure in the first edge treating section of the apparatus.

Referring now more particularly to the drawings, there has been shown in Fig. 1 a plan view of one preferred form of complete edging apparatus embodying the features of this invention. As there shown, the apparatus includes a first conveyor section A, and a second conveyor section B arranged at right angles to the first conveyor section. Both of these conveyor sections are adapted to support glass sheets in a horizontal plane, and to carry them forwardly in a substantially straight line from one end to the other; and mounted along either side of the conveyor sections A and B are edge treating units C which are adapted to grind or finish opposite edges of the glass plates as they move along the conveyor sections A and B.

With this arrangement, a plate 25 to be edge treated is placed on a loading conveyor D, located in advance of the first conveyor section A, and is moved thereby onto the first conveyor section. During travel over the conveyor section A, the two opposite short edges 26 and 27 of the sheet 25 will be appropriately treated by the adjacent edging units C, and will be in finished form by the time the sheet 25 passes from the conveyor section A onto the transfer section E which lies between the exit end of the section A and the entrance end of the section B. On the transfer section E the direction of travel of the sheet 25 will be shifted 90 degrees, in a manner to be more clearly hereinafter described, to feed it onto the section B and to present the two opposite long edges 28 and 29 to the edge treating units C associated with this second conveyor section.

As a consequence of this substantially continuous procedure, when the sheet 25 reaches the end of the conveyor section B and is received upon the discharge conveyor F, all four edges of the sheet 25 will have been edged.

As indicated above, and shown diagrammatically in Fig. 2, the actual edging tool of this invention is preferably in the form of an endless belt 30. The belt may be of canvas or other tough, flexible material, trained about a pair of spaced pulleys 31 and 32 to provide a working run 33 and a return run 34, and has its outside surface 35 coated with a suitable abrasive.

Abrasive belts of this general character have previously been used to grind the edges of glass sheets and it is customary to effect the grinding action by bringing an edge of a glass sheet to be ground into grinding engagement with the working run of the belt. To this end, the belt is positioned with the length of its working run arranged at an angle to the plane of the sheet to be edged, and the angle chosen is decided by the type of edge finish to be produced.

For example, with the length of the working run 33 at an angle such as is shown in full lines in Fig. 2, the upper longitudinal corner 36 of a glass sheet 25 will be ground off to produce a beveled, or part of a seamed, edge. A similar result will be obtained when the length of the working run 33 is positioned at the angle shown by the broken lines in Fig. 2, except that the lower longitudinal corner 37 of the sheet will be ground off. On the other hand, a square corner can be produced by arranging the length of the work run 33 at right angles to the plane of the sheet 25 being ground, and various other edge finishes can be obtained by suitable alteration in the angle made by the length of the working run of the belt with the plane of the sheet.

Now all of these various edge shapes can be produced and/or finished by the apparatus of the present invention. But what is more important, they can be produced on edges of curved or irregular, longitudinal contour, as well as on straight edges and, in addition, corner edge areas, connecting the edge being ground with the two adjoining edges of the sheet, can also be treated at the same time and as part of the same operation.

As best illustrated in Fig. 3, this is accomplished, regardless of the angle of the length of the working run 33 with the plane of the sheet, first by positioning the working run 33 of the belt 30 in the path of travel of the edge area to be treated and, second, by arranging the width of the working run 33 of the belt diagonally of the path of travel of this edge area and with the abrasive surface 35 of the belt at an acute angle to the edge to be treated.

With this arrangement, as the sheet 25 moves in the direction of the arrow, the angled width of the working run 33 of the belt 30 will be contacted first by the curved corner edge area 38, causing the flexible working run of the belt to conform to the contour of the corner edge area during grinding as shown at 39, and this will be true regardless of whether the corner is curved (as shown) or sharp. Then, as the sheet 25 moves on, the working run of the belt will progressively contact and grind the entire side edge 40 of the sheet as illustrated at 41. During this time, the thrust of the glass sheet against the working run of the belt flexes or twists the glass contacting portion thereof into the position shown at 41 where it is substantially parallel with the edge being ground. At the same time, the tendency of this portion of the belt to return to its normal or diagonal position relative to the glass edge (as indicated in broken lines at 41a) will maintain it in intimate contact therewith and insure full grinding action, regardless of whether the belt is acting on an edge that is of straight, curved or otherwise irregular longitudinal contour. This same tendency of the width of the working run of the belt to regain its normally angled position, will cause it to maintain its engagement with the following corner 42 of the sheet, as shown at 43 and 44, to grind the same, as the end of the sheet approaches and moves past the working run of the belt.

As pointed out above, the abrasive belt grinding tool of the invention when properly mounted and positioned will operate in the manner just described to produce and/or finish both longitudinal side and corner edge areas of the desired type, even on unusually large or irregularly sized and shaped sheets, regardless of the angle at which the length of the working run 33 of the belt 30 is held to the plane of the sheet.

The invention has, to date, had its greatest commercial success when used in connection with the seaming of the edges of glass sheets, and it will be specifically described in that connection here.

The term "seaming" is used in the glass art to describe a type of edge finish, usually given to cut sizes of glass, and in which the top and bottom longitudinal edge corners of the sheet are ground down to remove the objectionable sharp edges. In the particular embodiment of the invention shown in the drawings, the belt grinding tools carried by the edge treating units C are so positioned and arranged relative to the path of travel of a glass sheet through the complete edging device shown in plan view in Fig. 1 that when a glass sheet has completed its travel over the conveyor sections A and B and has been discharged onto the conveyor F the entire perimeter of the sheet will have been properly seamed.

Thus, the abrasive belts 30 in units 45 and 46, of the edge treating units C that are associated with the first conveyor section A, have the length of their working runs 33 angled with respect to the plane of a glass sheet on the conveyor as shown at 47 in Fig. 2 and at 48 in Fig. 4, to grind the upper longitudinal corner 36 of the short side 26 of said sheet. The working run of the belts associated with units 49 and 50 are angled as shown at 51 in Fig. 4, to grind the upper longitudinal corner 36 of the opposite short side 27 of the sheet; the working runs of the belts of units 52 and 53 are angled as shown at 54 in Figs. 2 and at 55 in Fig. 4, to grind the lower longitudinal corner 37 of the short side 26 of the glass sheet; and the working runs of the belts of the units 56 and 57 are angled as shown at 58 in Fig. 4, to grind the lower longitudinal corner 37 of the opposite short side 27.

At the same time, the width of the working runs of the abrasive belts of all these edge treating units are located in the path of travel of the edge area and diagonally thereof as shown in Fig. 3, so that each belt will grind not only a side edge of the glass sheet but also a portion of the corner edge area at either end thereof.

The belts 30 may be faced with abrasive of any desired grade to give either a rough or a fine grind. Or, where, as in the present embodiment, a plurality of belts operate on the same edge area, the first of these may be a coarse or cutting abrasive tool and the final ones a fine or finishing tool.

The edge treating units C that are associated with the second conveyor section B are duplicates, both in structure and arrangement of abrasive belts, of those associated with the first conveyor section A, and so will edge treat the opposite long side edges 28 and 29 of a glass sheet 25 passing along the conveyor section B in the same manner as the short side edges 26 and 27 have been treated on the conveyor section A. As a result, when a glass sheet has been conveyed in one direction along the conveyor section A and then in a direction at right angles thereto along the conveyor section B, the entire perimeter of the sheet will have been seamed by the edge treating devices C.

With regard now to the detailed construction of the complete edging apparatus shown in Fig. 1, the loading conveyor D, upon which glass sheets 25 are received and passed to the conveyor section A of the complete edging apparatus, may be of the conventional endless belt type and driven by a chain and sprocket connection 59 from a suitable source of power 60.

The conveyor section A, upon which the two opposite side edges 26 and 27 of the glass sheets 25 are to be treated, comprises a driven roll type conveyor 62 in horizontal alignment with the loading conveyor D, and a series of transversely arranged, alternately reversed framing structures 63 for supporting the conveyor 62 and the edge treating units C that are associated with this conveyor section.

As shown in Figs. 1 and 5, each of the framing structures 63 is in the form of a generally rectangular framework made up of a pair of vertical columns or standards 64 and 65 connected together at their upper ends by the horizontal channels 66 and adjacent their lower ends by the similar channels 67. Spaced from the standard 64 of each framing structure 63 a distance sufficient to accommodate the roller conveyor 62 is an auxiliary vertical standard 68 which is also secured to the channels 66 and 67 as best shown in Fig. 5.

Alternate framing structures 63 are arranged in reversed and staggered relationship to, and spaced from, one another so that the vertical standard 64 of each framing structure is in line with the auxiliary standard 68 of the framing structure on either side. With this arrangement, the major portions of alternate framing structures 63, terminating in the vertical standards 65, will extend outwardly at opposite sides of the conveyor section A for mounting the edge treating units 45, 46, 49 and 50 in a manner to be more clearly hereinafter described; and the rectangular frames bounded by the vertical standards 64 and 65 and the horizontal channels 66 and 67 of each framing section will be in horizontal alignment in order to accommodate and support the roller conveyor 62 extending therethrough.

For this purpose, there is secured to the vertical standards 64 and 65 of each framing structure, between the horizontal channels 66 and 67, a bridging beam 73, and these bridging beams carry the pairs of side rails 69, 70 and 71, 72 of the roller conveyor 62 (Figs. 1, 5 and 6). It will be noted that the pairs of side rails 69, 70 and 71, 72 consist of a plurality of longitudinally spaced sections and that the sections of the pair 69 and 70 on one side of the conveyor are staggered relative to the sections of the pair 71 and 72 on the opposite side of the conveyor so that each bridging beam 73 carries the forward ends of the rails of a section of one pair of side rails and the rearward ends of the rails of a section of the other pair of side rails. In this way, the spaces between the side rail sections will form staggered open areaways 74 in opposite sides of the conveyor 62 to permit the location of edge treating units C in position to operate upon the glass sheets on the conveyor as they pass at these points.

At the entry or receiving end of the conveyor section A, the outer side rail 69 of the roller conveyor 62 is extended forwardly beyond the first bridging beam 73, as at 69', and a supplementary section 72' of the opposite outside side rail 72 is secured to and also extends forwardly from the beam 73 a corresponding distance, to carry the initial rolls 75 of the roller conveyor 62.

All of the rolls of the conveyor 62 are preferably made up of a body portion 76 of suitable material such as rubber which is vulcanized or otherwise secured to a shaft 77, and the shafts of the initial rolls 75 are journaled in bearings mounted on the extensions or continuations 69' and 72' of the outside rails 69 and 72 of the conveyor. The initial rolls 75 are all of the same length and are mounted in the same way as the rolls 79 which are located, and adapted to support and convey glass sheets, between the open areaways 74; the opposite ends of the shafts 77 of the rolls 79 being journaled in bearings 80 mounted on the outside rails 69 and 72.

However, within the open areaways 74, it is necessary to employ conveyor rolls of different lengths, and mounted in a somewhat different manner, in order to support a glass sheet carried thereby on one side and to expose the other side of the sheet to the action of the edge treating units C which are movably operable within these areaways. Thus, as will be noted in Fig. 6, there is provided in each of these areaways 74 a short central roll 81 and two flanking rolls 82 and 83 of intermediate length. All of these central and flanking rolls that serve the areaways 74 on one side of the conveyor 62 are supported from one end only, by having that end of their respective shafts 77 journaled in bearings 84 and 85 mounted on the pair of side rails 69 and 70 respectively. Similarly, those central and flanking rolls that serve the areaways on the opposite side of the conveyor are also mounted from one end only by having an end of their shafts 77 journaled in similar bearings 86 and 86' carried by the opposite pair of side rails 71 and 72.

The rolls 75, 79, 81, 82 and 83 throughout the section A of the edge treating apparatus are driven in common from a centrally located power unit 87, as shown in Figs. 1 and 15, by means of a progression of link belts 88 trained about double sprockets 89 and 90 carried on the ends of the roll shafts 77 in the closed end of each areaway 74. The belts 88 are arranged, as is shown in Fig. 6, to couple pairs of shafts in driving relation by being trained about adjoining pairs of sprockets 89 and alternately adjoining pairs of sprockets 90. The power unit 87 is operatively connected to one shaft 77, indicated at 91 as the power take-off, by a link belt 92 trained about a sprocket 93 of said shaft and a similar sprocket on the shaft of the power unit. This shaft 91, as well as the shafts 77 of the other rolls 79, as will be noted in Fig. 6, has sprockets 89 keyed thereon at both of its ends so that the progression of link belts 88 will drive the plurality of rolls located forwardly and also rearwardly of the said shaft. More particularly, from the power take-off shaft 91, the progression of link belts 88 will carry driving power to the entry end of the section A through the belt series indicated at 88a, then at the last full length roll 79 will transfer the drive across the area of the conveyor 62 to the series of belts 88b which will again transfer the drive to a series of link belts located similarly to the belt series 88a. Likewise from the opposite end of the take-off shaft 91, the sprocket 89 secured thereon will drive the belt series 88c to carry the driving power rearwardly through the section A in a similar alternating manner.

Figure 7:
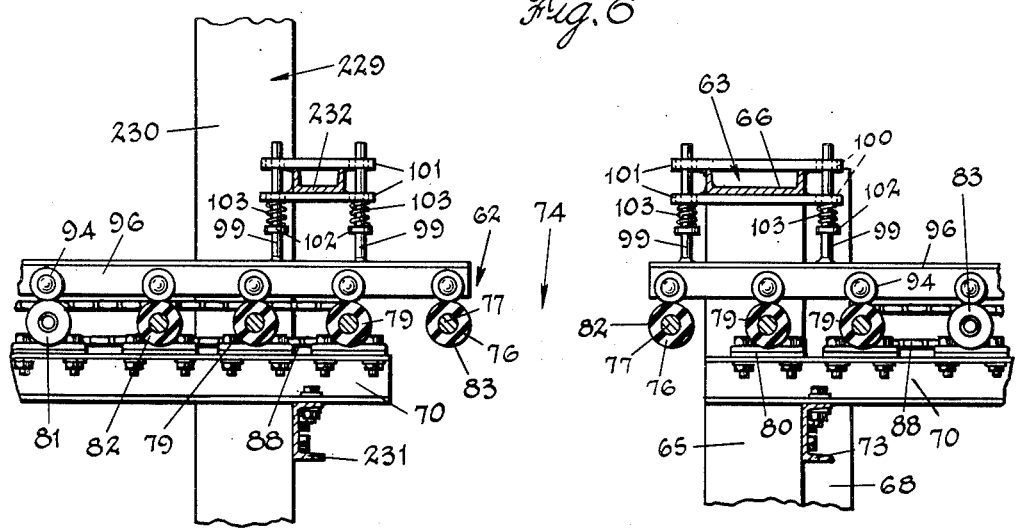
Fig. 7 is a vertical longitudinal detail view of the supporting structure, taken substantially on line 7—7 of Fig. 6.

To urge the sheets downwardly onto the rolls of the conveyor 62 and more particularly restrain them from shifting laterally during the edging action of the abrasive belts of the edge treating units C, a series of spring pressed rollers 94 (Fig. 7) are supported above the glass sheet and caused to elastically press downwardly upon the same. These rollers are each rotatably mounted by their internally journaled shaft 95 on angle bars 96, connection being made thereto by a nut 97 on the threaded end 98 of said shaft, as shown in Fig. 14. The angle bars 96 are provided at each end with vertically disposed rods 99 that extend through slotted openings 100 of a plurality of bars 101 carried by, as shown in Figs. 6 and 7, and secured to the top and bottom surfaces of the upper horizontal channel 66 in the first portion of the section A.

Each rod 99 has an integral collar portion 102, said collar supporting one end of a spring 103 that bears at its opposite end against the lower bar 101. The normal energy of the springs 103 located at each end of an angle bar 96 is to urge the same downwardly and consequently position the rollers 94 against the rolls of the conveyor 62 or the sheet of glass 25 moving thereon. The angle bars 96, similarly to the side rails 69, 70, 71 and 72, previously described, are alternately arranged according to the open areaways 74 and to exert a downward thrust, by the springs 103, on that area of the glass sheet 25 supported on the short rolls 81, 82 and 83 and intermediate full length rolls 79 while the edge of the unsupported area is being actively engaged by the belt 30 of the adjacent edge treating unit C.

As best shown in Fig. 8, the horizontal channels 66 and 67 of the framing structures 63 provide a support for the edge treating units C. Each of these units C comprises a carrier cradle or carriage 104, a motor support frame 105, and a belt support arm 106 mounted thereon. These associated members of the edging units are suitably formed, and provision is made herein, so that their relative positions of association may be reversed and, without modification, they will be adaptable to function according to the desired positions of the edging units throughout the edge treating apparatus as shown in Figs. 1, 8 and 15, or Figs. 21 and 22. For example, the motor frame 105 may be inverted from a position shown in Fig. 8 to a position such as is shown in Fig. 15, depending on whether the edge treating unit C is to be bodily located in a position generally above or below the horizontal path of travel of the glass sheets on rolls of the conveyor 62. Likewise, the belt supporting arm 106 of each unit C is adapted to be mounted on the related motor frame 105 so as to extend substantially into the path of the glass sheets so as to locate the abrasive belt 30, in contactual relation to either the upper or lower longitudinal corner of said glass sheet as shown in Fig. 4. The supporting arm 106 is thus locatable with respect to the motor frame so as to be disposed in a substantially upward direction when the carriage 104 in general is disposed below the plane of the conveyor rolls, as shown in Fig. 8; or to be located in a generally downward direction therefrom when said cradle is disposed above the plane of the conveyor rolls, as will be noted in Fig. 15. As will be set forth more in detail hereinafter, the supporting arm 106 is also finished on its opposite surfaces to provide for mounting of said arm on either side of the path of the glass sheets as they are carried on the rolls of the conveyor 62 and is thus adaptable to association with the motor frame 105 so that it will always be directed inwardly toward the said rolls.

The foregoing general description is believed to set forth the novel construction of the edge treating units C; namely that, according to the disposition of the carriage 104, the motor frame 105 is adapted to positional relation in at least two manners of construction while the supporting arm 106 is so constructed as to be associated with said motor frame in at least four positions. In other words, without alteration or modification, the component parts of the edge treating units are capable of assembly in various positions of relationship whereby the abrasive belts 30 will be directed against the designated corner of a glass sheet and according to the side of the said sheet to be treated.

The carrier cradle or carriage 104 is supported for movement between the horizontal channels 66 and 67 which are provided with directive track elements adapted to carry said frame in a substantially horizontal plane and also sustain the same in a substantially vertical position. More particularly, the carriage 104 has a generally open rectangular form having a web that is T-shape in cross section and including a top web section 107, bottom web 108 and side web sections 109. The side web sections 109 are formed in their lower portions to provide outwardly directed flanges 110 in which are journaled the axles 111 of wheels 112. The wheels 112 support the carrier cradle 104 in rolling contact on a vertically projecting rail 113 mounted on the web 114 of the lower horizontal channel 67 and secured thereon between angles 115. Preferably, the rail 113 is secured by bolts 116 between the upstanding legs 117 of said angles 115 while the horizontally disposed legs 118 thereof are fixedly secured to the web 114 of channel 67 by bolts 119, substantially as is shown in Figs. 8 and 12.

Provision is herein made for maintaining the carriage 104 in an alignment of movement with the rail 113 by means of a plurality of rollers 120 that are carried on vertically disposed shafts 121 journaled in bosses 122 integrally formed in the bottom web section 108 of the cradle. If desired, the shafts 121 may be eccentrically located with reference to the axes of the rollers 120 so that said shafts can be revolved within the bosses 122 to compensate for misalignment or wear, in a manner well known in the art. The rollers 120 are disposed on opposite sides of the bottom web 108 of the carriage 104 and cooperate with series of rollers 123 disposed along the upper web 107 to maintain the said cradle in a freely movable, vertical position. More particularly, the rollers 123 are journaled on shafts 124 threadably secured in bosses 125 formed on the upper section 107 of the web of the cradle as shown in Figs. 8 and 11. The rollers 123 are located in the opposite upper corner areas of the carriage and their peripheries engage bars 126 and 127 which constitute side rails secured in spaced relation to the under surface of the web 128 of the upper horizontal channel 66. Intermediate the rollers 123 and generally in a central location on the upper web section 107 of the carriage 104 there is also a roller 129 journaled on a shaft 130 carried in ears 131 which roller rides on the under surface of the channel web 128 and acts in an auxiliary sense to prevent the cradle from becoming vertically displaced from the rail 113.

The carriage 104 is movable along the rail 113 to provide for such lateral adjustments as may become necessary to accommodate glass sheets having different widths and/or lengths. Obviously a variety of dimensional sizes are not passed at random or without selection through the apparatus and lateral adjustment of the carriages 104 in either of the sections A or B is preferably made before a production run of one particular size of sheet. For this purpose, the rail 113 is provided with a series of slotted openings 132 which may be regularly spaced along its body portion as is shown in Fig. 8. Each of the carriages 104 is secured in any of the positions to which it may be adjusted, by means of bolt and nut connections 133 that are passed through openings 134 in a plate 135, carried by the carriage, and the openings 132 of the rail 113. The plate 135 is attached to the lower web 108 of said carriage by bolts 136 as may be seen in Fig. 9. The carriages 104, disposed along the path of travel of the glass sheets and alternately on opposite sides thereof, may each be accordingly shifted laterally inwardly or outwardly to properly position the abrasive belt of their related unit C according to an increase or decrease in the width or length of the glass sheets to be edge treated.

The motor frame 105 is pivotally carried within the carriage 104 so that it is swingable about a vertically disposed axis. For this purpose, as will be seen in Figs. 8 and 12, the T-sectional web of said carriage is enlarged to provide pads 137 and 138 in the medial area of its upper and lower sections 107 and 108 respectively. On the pads 137 and 138 are mounted bearings 139 and 140 in which are journaled stub axles 141 and 142 of the motor frame 105. The stub stafts 141 and 142 are received and secured in bosses 143 integrally formed in vertically axial relation in the web 144 of the frame. More particularly, the frame 105 has a generally rectangular outline described by the L-section web 144 which includes a top web section 145, bottom web section 146 and vertical side web sections 147.

At the corners formed by the several sections of the web there are outwardly projecting upper and lower web sections 148 and 149, respectively, that terminate in and support a mounting panel 150 for the support arm 106. As shown in Fig. 12, the mounting panel 150 is inclined to the vertical plane so that the arm 106 will be disposed at an angle of substantially 75 degrees, and, while this angle is stated as an example, the panel may be located at other desired angles according to the best presentation of the abrasive belt to the work.

The motor frame 105 is generally swingable about the vertical axis afforded by the stub axles 141 and 142; however, it is preferable to restrict this axial movement to maintain the belt 30 while in grinding or abrading engagement with the glass so that it will be caused to flex in the immediate area of its engagement, or the working run, from the normal continuity of its travel and to modulate this restriction only to direct the belt into the path of the oncoming glass sheet and cause it to follow the same at the trailing corner thereof. For this purpose, an automatic control is imposed on the motor frame to normally restrain it in one position and at the same time allow its axial motion in at least one direction should the tension in the belt set up a thrust on the glass that is excessive to that pressure desired in the area of grinding.

As herein set forth, as will be noted in Figs. 8 and 10, the frame 105 is provided with arms 151 and 152 projecting outwardly from the side webs 147. Preferably, the arm 152 is located from the top web 145 a distance that is equal to the location of the arm 151 from the bottom web 146 in order that it will be similarly positioned when the frame 105 is inverted, as previously set forth. According to one position of the frame 105, such as that shown in Figs. 8 and 10, the extremity of the arm 151 is located between resiliently acting elements generally designated 153 and 154; one being adapted to vary the normal position of the frame 105 while the other element is capable of permitting axial motion of said frame to reduce developing tension in the belt 30. The elements 153 and 154 are bodily carried on a bracket 155 that is fixedly secured to a side web 109 of the carriage 104 by means of a bifurcated end 156. Outwardly from the end 156, the bracket 155 has a reenforced arm portion 157. At the outer end of the reenforced portion 157, there are formed at substantially right angles thereto outwardly and upwardly formed arms 158 and 159. The arm 158 is adapted to carry the resiliently acting element 153 while the element 154 is carried by the arm 159.

The element 153, as shown in Fig. 10, comprises a rod 160 having an enlarged head 161 at one end thereof and having the opposite end threaded as at 162. The rod 160 is bodily and slidably carried in a sleeve 163 formed as a part of the arm 158. Between the enlarged head 161 and the adjacent end of the arm 158, there is interposed an expansion type spring 164 which normally exerts its pressure against the head 161 to urge the same against the arm 151 but this spring characteristic is restricted by lock nuts 165 threaded onto the end 162 of the rod 160 extending outwardly from the sleeve 163. By adjusting the positions of the lock nuts 165 along the threaded end 162, the expansibility of the spring 164 can be regulated and the amount of extension of the rod thus be controlled when the desired normal position of the motor frame is once ascertained.

The element 154 is carried on the arm 159 of bracket 155 and is provided in the form of a fluid responsive cylinder 166 and piston 167 contained therein. The outer head 168 of the rod 169 for piston 167 is disposed in engagement with the arm 151 in opposition to the head 161 of rod 160. The piston 167 is under constant pressure to urge the rod 169 outwardly and this pressure is supplied from a reservoir 170 also carried on the arm 159. The reservoir 170 is provided with an adjustable, spring loaded piston 171 which will maintain a constant head pressure in the cylinder 166, and consequently the end 168 of piston rod 169 in contact with the arm 151 of the motor frame 105.

Thus, when the desired angle of engagement of the belt 30 has been established with reference to the edge of the particular size or contour of glass sheet to be ground, the nuts 165 are adjusted along the threaded end 162 of the rod 160 until the expansion of the spring 164 and the pressure within cylinder 166 are balanced or equalized. Now, if the thrust imposed by the glass sheet on the belt 30 in its working run exceeds the normally desired tension, the reacting force will cause the motor frame 105 to pivot on the stub axles 141 and 142, causing the arm 151 to press against the head 168 of the piston rod 169 and temporarily overcome the predetermined pressure within the cylinder 166 to urge the piston 167 therein inwardly and the contained fluid into the reservoir 170. When this pressure condition is reduced or corrected, the piston 171 of cylinder 170 is caused by its spring load to return the fluid to the cylinder 166 and force the piston rod 169 outwardly thereof until the arm 151 is again brought into contact with the head 161 of the spring governed rod 160.

The support arm 106 of the edge treating unit assembly has a generally arched or curved outline that is followed throughout the H-shape cross section 172 of its body portion. At the ends of the arm, this particular cross section 172 is flared outwardly to form bifurcated ends or yokes 173 and 174. As shown in Fig. 12, one end of the support arm, as by the yoke 173, is fixedly positioned against the mounting panel 150 and is provided in its side walls 175 with openings 176 through which securing bolts 177 are threaded into said panel.

Preferably, the outer surfaces 178 of each side wall 175 are suitably finished for mounting the arm 106 against panel 150, as previously described, so that the said support arm can be located in any of the positions as shown in Figs. 8, 11, 15, 21 and 22, and so as to project inwardly with respect to the open areaways 74 from the motor frame 105 on the opposite sides of the roll conveyor 62 since the edging units are located in alternate relation on the opposite sides of the apparatus. Also, the bolt openings 176 in the side walls 175 are also arranged to register with the complementary threaded openings 179 in the panel 150 when the arm 106 is positioned to extend upwardly or downwardly as particularly shown in Figs. 8 and 15.

The side walls 175 of the arm yoke 173 are also formed with suitable openings 180 to receive a journal bearing 181 for a shaft 182 on which a drive pulley 183 for the abrasive belt 30 is securingly mounted, said bearing 181 being secured within a recess 184 formed in the body of the panel 150 of the frame 105. The shaft 182 is operatively connected to a motor 185 that is mounted on a ledge 186. The ledge is integrally formed with the bottom web section 146 of the frame 105 and has a platform surface 187 disposed at substantially right angles to the mounting panel 150 in order that the pulley 183 and motor 185 will be located in axial alignment and substantially at right angles to the major axis of the vertically inclined arm 106.

In the yoke 174 at the opposite end of the arm 106, a belt supporting pulley 188 is located between the side walls 189 thereof and mounted on the journaled shaft 190. Trained about the pulleys 183 and 188 and a tension idler pulley 191 is the continuous abrasive grinding belt 30. (To coordinate the earlier description of the belt 30 with the immediate detailed description, it is here pointed out that the pulleys 183 and 188 were previously and broadly mentioned as the "pair of spaced pulleys 31 and 32," in connection with Fig. 2 of the drawings.)

The idler pulley 191 is rotatably carried on the support arm 106 by means of a double arm yoke member 192 that normally is sustained in an outwardly directed, tension-creating position by means of a pair of springs 193 as best seen in Figs. 8, 11 and 13. The yoke member 192, as best seen in Fig. 13, is pivotally carried on the supporting arm 106 by means of a shaft 194 that is secured in an integral boss formation 195 of the arm by a set screw 196. The opposed outer ends 197 of shaft 194 are located in trunnions 198 formed in the leg portions 199 of the yoke member 192. The legs 199 project from centrally formed bosses 200, that are interconnected by a web 201, and from which extend in the opposite direction the leg portions 202. The outer ends 203 of said legs 202 are provided with openings for receiving and supporting a threaded shaft 204 on which are mounted bearings 205 for the idler pulley 191 and which are received in recesses 206 in the end walls 207 thereof. To secure the shaft 204 within the legs 202, the same is provided with a head 208 which is drawn against one leg by means of a nut 209 threaded thereon and against the opposed leg 202.

The centrally disposed bosses 200 of the yoke 192 are provided with suitable openings to receive shafts 210 integrally formed with blocks 211. The blocks are retained in surface bearing relation with the outer surfaces of the bosses 200 by cotter pins 212 inserted through the outer ends of the shafts 210 and bearing against suitable washers 213. The blocks 211 are cross drilled as at 214 to slidably support rods 215 upon which the springs 193 are loosely carried.

The rods 215 are pivotally supported at their opposite ends on arms 216 (Fig. 11). The arms 216 are fixedly mounted on a common shaft 217 that is journaled in a transverse boss 218 formed in the H-section 172 of the arm 106 and preferably one of said arms 216 is formed to have a diametrically projecting portion for providing a crank 219, having a handle 220, for manually actuating the arms 216 and thereby the rods 215. The ends of the rods 215 are secured in substantially square members 221 that are pivotally supported on the arms 216 by pins 222. The springs 193 being located between the blocks 211 and square end members 221 of the rods 215 will thus be compressed when the members 221 are carried toward the blocks 211 thereby urging the tension pulley 191 into a tension creating position with reference to the grinding belt 30 and as the yoke member 192 is swung on its supporting shaft 194. In this manner, when the arms 216 are rotated by the crank 219 in one direction or clockwise as viewed in Fig. 11, said rods will slide rearwardly with reference to the blocks 211 and reduce the action of the springs 193 and consequently relieve the tension of the belt 30. When rotated in a counter-clockwise direction, the arms 216 will carry the rods 215 forwardly toward the blocks 211 and will set up a tension in said belt as the springs 193 bear against the side blocks, and urge the yoke member 192 outwardly.

The edge treating units are thus composed of three generally basic members; namely, the carrier cradle or carriage 104, the motor frame 105 and the belt support arm 106, which are adapted to a variety of positional relationships, one with the other, so that they may be assembled in one arrangement or another and employed throughout the entire edge treating apparatus. Furthermore, means has herein been provided for the lateral positioning of the edging units according to the width or length of the glass sheets. Also, the motor frame 105 and support arm 106 are automatically controlled in their axial relation to the carriage 104 in order that the belt 30 will be maintained against the edges of the glass sheet with a desirable degree of abrading pressure. In the edge treating units C, identified heretofore by the numerals 45 and 46, in Fig. 1, the basic members of the units will be similarly assembled; however, in the units, identified as 49 and 50, on the opposite side of the conveyor 62, the belt support arm 106 will be reversed with respect to its relation to the motor frame 105.

As shown in Figs. 1 and 8, the abrasive grinding belts 30 of the edge treating units identified by the numerals 45, 46, 49 and 50 have been supported and driven on the said units so that they were trained about the pulley 188, disposed above the glass sheet 25, the drive pulley 183 and the idler pulley 191 positioned to support and effect a tautness in particularly the idle run of the belt. The working run 33 of the abrading surfaces of the belts in this particular arrangement are directed in a downward course against the upper longitudinal corner 36 of the glass sheet 25.

Returning now briefly to Figs. 1 and 4, it will be noted that the glass sheet 25 in passing through the first areaway 74 will have the upper longitudinal corner 36 along one side acted upon, as indicated at 26 in Fig. 4, by the edge treating unit 45 positioned on one or the left side of the supporting roll conveyor 62. As the sheet enters the second areaway 74, the upper longitudinal corner 36 of the opposite side, as indicated at 27 in Fig. 4, will be acted upon by the grinding belt 30 of the second edge treating unit 49 located on the opposite or right side of the apparatus. Since the carriage 104 of the various units is laterally movable along the rail 113, each of said units may be moved inwardly or outwardly to present the belt thereof against the glass sheet 25, according to its length, in this instance, and simultaneously the motor frame 105 may pivot about the vertical axes of the stub shafts 141 and 142 according to the influence of the control elements 153 and 154 when the ends of the glass sheet are not substantially at right angles to the sides thereof and also to compensate in part for flexing in the working run of the belt.

As previously set forth, the first and second grinding belts may be furnished with coarse abrading surfaces while the third and fourth belts should be furnished with abrading surfaces of finer abrasive to smooth the rounded corner edges produced by the first grinding belts. Thus, in moving through the third and fourth areaways 74, the glass sheet 25 will be acted upon by the edge treating unit 46 positioned on the same or left side of the apparatus as the first unit 45 and a fourth unit 56 on the same or right side as the second unit 49 whereby the edging operation will be repeated along the upper longitudinal corners 36 of sides as indicated at 26 and 27 in Fig. 4.

Continuing its movement through the first section A of the apparatus, the lower longitudinal corners 37 of the sides 26 and 27 of the glass sheets are acted upon. In order to treat these particular corner areas, the edging units C are mounted in such a manner as to present their grinding belts 30 along the said lower longitudinal corners 37 and the assemblage of their structures is altered so that said belts will be carried in a reversed position from that previously described. In Fig. 15, the motor frames 105 of the edging units 52 and 56, therein shown, are inverted so that the stub axle 141 will be journaled in the lower bearing 140 and the stub axle 142 in the upper bearing 139. It will also be noted that by inverting the frame 105, the arm 152 will be positioned between the control elements 153 and 154 thereby replacing the arm 151 heretofore described in connection with the operation of these control elements. The belt support arms 106 are now reversed in their mounted position with reference to the panels 150 of the frames 105. The end yoke 174 of each arm will thus be positioned beneath the glass sheet 25 in reversed location from that of the edging unit 50 shown immediately to the right or as shown in Fig. 8.

To suitably support the fifth to eighth edging units, or those identified by the numerals 52, 53, 56 and 57, with reference to the glass sheets 25 on the roll conveyor 62, the framework of the section A is increased in height so that the cradles or carriages 104 of these units will be mounted to best locate the abrasive belts 30 against the lower corner of the glass sheet.

As shown in Fig. 5, this latter portion of the framework is comprised of framing structures, generally designated 223, and which include vertical standards 224 and 225 and horizontally disposed channels 226 and 227. An auxiliary standard 228 similar to the standard 68, previously described, is also employed. Between the last framing structure 63 and the first structure 223, there is provided a tower 229 for supporting the roll conveyor 62 between said structures and to permit the desired alternate location of the edging units 50 and 52.

For this purpose, the standards 230 of said tower carry a beam 231, similarly mounted as the beams 73, for supporting the ends of the continuations of the beams 69 to 72 inclusive. At the tower 229, the means for supporting the pressure rollers 94 is also altered due to the increased height of the structures 223. As herein shown, bridging channels 232 are secured to the standards 230 and the standards 224 and 228 of the framing structures 223 at substantially the same elevation as the upper channels 66 of the framing structures 63. The bars 101 throughout the latter portion of the section A will thus be similarly secured to the channels 232.

The channels 227 are generally located at the same elevation as the beams 73 previously described, and will support the longitudinally extending beams 69 to 72 inclusive. As shown in Fig. 15, these beams, on which the bearings 80, 84, 85, 86 and 86′ are mounted, are arranged so as to extend between the standards 224 and 228 and to terminate on either side thereof. The bearings will therefore be located on the beams 69 to 72 inclusive that are similarly and alternately positioned throughout the framework to form the open areaways 74.

The edging units C are supported on the channels 227 by means of rails 233 and are maintained in their vertical positions by rails 234 and 235, carried by the horizontal channel 226 of the framing structures 223, and between which the rollers 123 are located. Similarly to the rails 113, the rails 233 are provided with slotted openings 236 through which the bolts 133 may be inserted to secure the cradles 104 by the plates 125 against the rails 233. Provision is thus made for mounting and supporting the grinding elements at one elevation throughout the first portion of the framework 61 and at a higher elevation throughout the second portion of the framework.

As a sheet 25 passes beyond the last edging unit 57 of the first grinding section A, it is received upon the transfer unit E and moved therefrom laterally so that in passing through the second edge treating section B, the upper and lower longitudinal corners of the longer sides 28 and 29 (Fig. 4) thereof will be acted upon by the edging units C positioned therein. Thus, the glass sheet is received transversely between the ends of the transfer unit E, as is shown in Fig. 1, and is removed therefrom in the direction of its longitudinal axis. This unit, which is shown in detail in Figs. 18, 19 and 20, comprises a framework 238 wherein a plurality of rolls 239 and 240 are disposed in superimposed relation and adapted to provide primarily a moving support surface for the glass sheet and a plurality of driven members to carry said sheet outwardly from the transfer unit E to the second edge treating section B of the apparatus when the sheet is elevated above the rolls 239. The framework 238 is formed by legs or standards 241 arranged in the corners thereof, side channels 242 and 243 and transverse or end channels 244.

Figure 19:
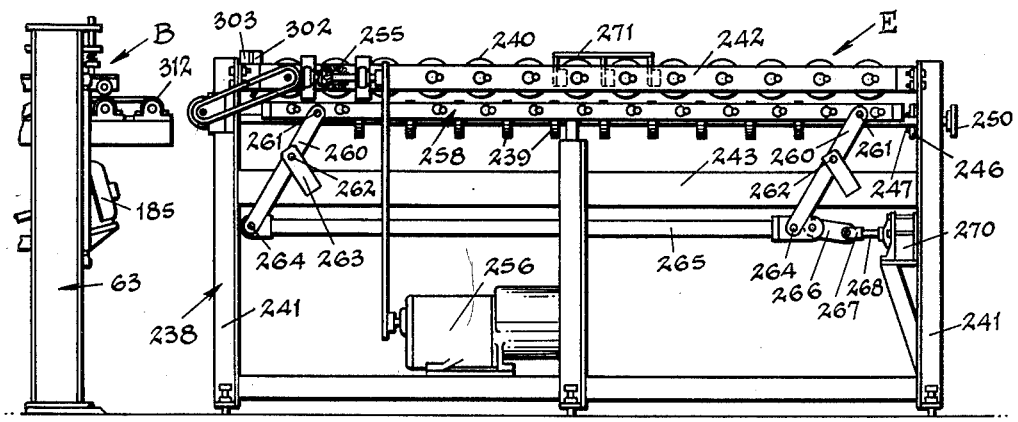
Fig. 19 is a side elevation of the transfer unit and the front end of the second edge finishing section of the apparatus.
Figure 20:
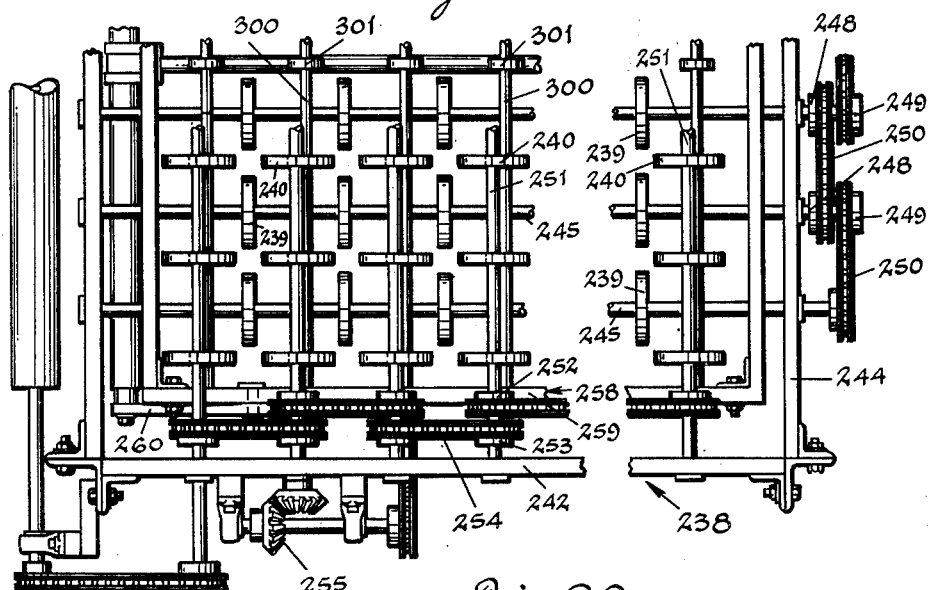
Fig. 20 is a fragmentary top view of the transfer unit, illustrating the several drives employed therein.

The plurality of rolls 239, which provide the glass supporting surface, are mounted in spaced relation on regularly spaced shafts 245 which are journaled at their opposite ends in end channels 244. The shafts 245 are also operated in common from the power unit 87 which operates the roll conveyor 62 of the edging section A. More particularly, the shafts are driven by a link belt 246 trained about the sprocket 89 on the last shaft 77 of the section A. The first shaft 245 of the unit E has a sprocket 247 (Fig. 19) mounted thereon and about which the belt 246 is trained. As shown in Fig. 20, each of the shafts 245 have sprockets 248 and 249 mounted thereon, said sprockets being alternately interconnected in pairs by link belts 250 so that from the first shaft they will be rotatably operated in common. In moving from the last rolls 70 of the section A, the glass sheet 25 will thus be carried by the power driven rolls 239 into the central area of the transfer unit E.

The plurality of rolls 240 are mounted on regularly spaced shafts 251 arranged transversely to and above the shafts 245 and which are journaled at their opposite ends in the side panels 242 of the framework 238. The shafts 251 are provided at one end with sprockets 252 and 253 that are interconnected by link belts 254, as shown in Fig. 20, so as to be operated in common from a take-off drive indicated at 255 and driven from a power unit 256. Preferably, the shafts 251 are rotated faster than the lower shafts 245 to produce a quick removal of the glass sheet once it is located centrally in the transfer unit.

As the sheet approaches this central area of the transfer unit E, its leading edge engages a limit switch 257 to actuate an elevating mechanism 258 to lift said sheet from the rolls 239 upwardly against the rolls 240. The frame 259 of the elevating mechanism 258 is interposed between the shafts 245 and 251 and is carried by pivotally mounted arms 260 pivotally connected at their ends to the sides thereof by stub shafts 261. The arms 260, as shown in Fig. 19, are supported on shafts 262 carried by brackets 263 secured to side channels 243 of the frame 238.

The arms 260 at each end of the frame 259 are interconnected at their lower ends by rods 264 which in turn are interconnected intermediate their ends by a tie rod 265. This tie rod is attached at one end by a link 266 to a clevis 267 threaded onto the end of a piston rod 268 that is actuated by its piston 269 contained within the cylinder 270. The limit switch 257 is supported on a bridge 271 carried by the side channels 242 and is positioned so that the incoming sheet on the rolls 239 will cause closure of the contacts of said limit switch that is connected in the circuit of an electrically actuated control valve 272 for the cylinder 270.

One side of the control valve 272 is connected to one end of the cylinder 270 by a pipe 273, while the opposite side of the valve communicates with the other end of the cylinder through pipe 274. This valve is of the conventional four-way type so that the supply pipe 275 thereto will be connected to either of the pipes 273 or 274 when the exhaust pipe 276 is connected to the other.

As diagrammatically set forth in Fig. 18, one side of the switch 257 is connected to a source of positive electric energy 277 by a line 278 and to the coil 279 of a solenoid relay switch 280 by a line 281, completing the circuit of said coil to the negative side of the source 282 by the line 283. The contacts of the relay switch are connected to the source of energy 277 and to the negative side of the source 282 in a conventional arrangement to produce reversal of the electrically responsive control valve 272 by lines 284 and 285. The fixed contacts of said switch are arranged in pairs and alternately complete circuits to the valve 272 through said lines 284 and 285 and by means of contactor bars 286 and 287 carried by the armature 288 of the relay 280. Thus, the pair of contacts 289 are normally closed by the contact bar 286 to maintain a circuit by line 290 from the source 277 to line 284 and one side of the valve 272, completing said circuit by line 285 through the pair of contacts 291, bar 287, and lines 292 and 283 to the negative side 282. The armature 288 is conventionally held in this position by means of a spring 293.

As presently shown, the pressure supply from the pipe 275 is directed through the pipe 273 to the rear end of the cylinder while the pipe 274, connected to the forward end of the cylinder, communicates through the valve with the exhaust pipe 276. The pressure system to the cylinder 270 will thus be such that the elevating mechanism 258 is maintained in its lowermost position while the pairs of contacts 289 and 291 of relay switch 280 are positioned as above described.

When closure of the contacts of the limit switch 257 is effected by the engagement of a glass sheet 25, a circuit will be completed from the positive source 277 by line 278 through contacts of the said switch, and by line 281 to the coil 279 of relay switch 280 and by line 283 to the negative side 282 and consequently the armature 288 will be moved against the spring 293 to remove contactor bars 286 and 287 from the pairs of contacts 289 and 291. Moving in response to the coil 279, the armature 288 will bring said contact bars into circuit closing engagement with pairs of contacts 294 and 295. One side of the contacts 294 is connected by branch line 296 to the negative return line 292, while the opposite side is connected by branch 297 to the valve 272 through line 284. Conversely, one side of the contacts 295 will be connected by branch line 298 to positive branch lead 290 while the opposite side is extended by branch 299 and line 285 to the valve 272. As a consequence thereof, the polarity of the valve's electrically actuated portion will be reversed. The valve 272 will now be caused to direct pressure from the supply pipe 275 through the pipe 274 to the forward end of the cylinder, thereby moving the piston rod 268 inwardly and through the interrelated rods 264 and 265, causing the arms 260 to swing so as to raise the frame 259. Simultaneously, the rear end of the cylinder 270 will be connected by pipe 273 to the exhaust pipe 276.

Journaled in the sides of the said frame 259 are a series of freely rotatable shafts 300 which carry rolls 301. When the frame 259 is raised, the rolls 301 are moved into contact with the under surface of the glass sheet 25 and so as to lift it from the lower rolls 239 and upwardly against the upper rolls 240. Since the rolls 240 are power driven, the sheet will then be moved across the surface afforded by the rolls 301, as shown in Fig. 17, and carried outwardly from the transfer unit E to the second edge treating section B.

To maintain the frame 259 elevated until the sheet has been moved from the area of the lower rolls 239, a limit switch 302, carried on a bridge 303 on the frame 238, is closed upon engagement by the glass sheet. Preferably, the limit switch 302 is disposed in the end of the unit E adjacent the section B of the apparatus and will be closed by the leading end of the sheet 25 as the same is being carried laterally to its previous line of travel. Closure of the contacts of said switch 302 will complete a bridging circuit from the line 278 by line 304 to the line 281 emanating from the switch 257 to hold the coil 279 energized and will continue after opening of the limit switch 257 and until the following end of the sheet 25 approaches the last row of rolls 240. The limit switch 302 may thus be connected to the positive side 277 of the electrical source by line 305 and connected to the line 281 by said line 304 so as to bridge the limit switch 257 and retain the valve 272 in its reversed position.

When, however, the contacts of the limit switch 302 open, the bridge circuit through line 304 to coil 279 of the relay switch 280 will be discontinued. The coil 279 will now become de-energized and the spring 293 will retract the armature 288 so that the circuit of the pairs of contacts 294 and 295 will be opened and the circuits through the source 277, line 290, pair of contacts 289 and line 284 to the valve will again be established by contactor bars 286 and 287; completing the same by line 285, pair of contacts 291 and lines 292 and 283 to the negative side 282. The valve 272 will thus be reversed immediately upon departure of a sheet of glass from the transfer section E so that the supply pipe 275 will again be connected by the pipe 273 to the rear end of the cylinder 270, causing the arms 260 to lower the frame 259 thereby displacing the rolls 301 from their elevated, glass supporting position. The transfer section E will now be in condition to receive a subsequent sheet from the edge treating section A.

Figure 23:
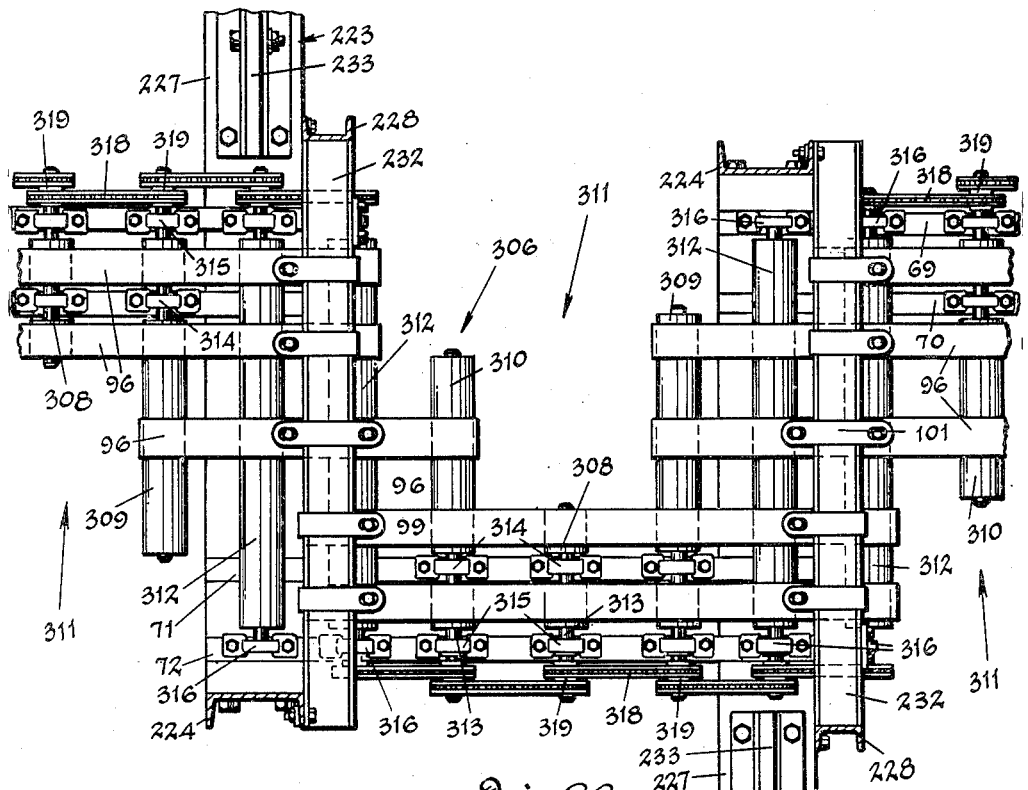
Fig. 23 is a fragmentary detail view of the glass supporting and conveying structure in the second edge treating section of the apparatus.
Figure 24:
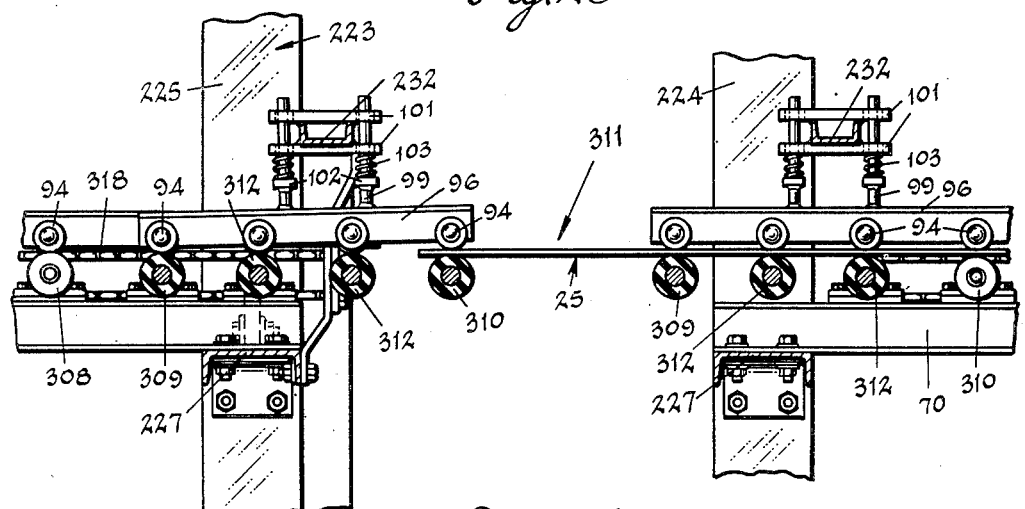
Fig. 24 is a vertical longitudinal detail view of the supporting structure shown in Fig. 23.

The second edge treating section B of the apparatus, as shown in Figs. 21 and 22, is substantially a duplication of the first section A. However, as shown in Fig. 23, the supporting surface of the roll conveyor 306 as provided by a plurality of rolls, is considerably narrower than the roll conveyor 62, since the glass sheet 25 is now being moved with its longer dimension extending in the direction of the longitudinal axis of the section G. The rolls 308, 309 and 310 of the conveyor 306 in the open areaways 311 are provided in short and intermediate lengths to suit the edging section B, as previously described in conjunction with the rolls 81, 82 and 83. Between the open areaways 311, the glass sheet is similarly supported on full length rolls 312. The shafts 313 of the rolls 308, 309 and 310 are journaled at one end thereof in bearings 314 and 315, while the shafts of the rolls 312 are journaled in bearings 316 at their opposite ends. The bearings 314 and 315 are mounted, as previously described in connection with the bearings 84, 85, 86 and 86', in alternate order on the beams 69, 70, 71 and 72 according to the open areaways 311, and the bearings 316 are mounted on the beams 69 and 72. The rolls 308, 309, 310 and 312 are driven in common from the power unit 317 through link belts 318 trained about sprockets 319 secured on their related shafts.

In this section, the edging units C are supported substantially as previously described in connection with the first section A; namely, and as shown in Fig. 21, in connection with the first four units C, the support arms 106 for the grinding belts 30 are disposed so that their end yokes 174 are positioned above the sheet of glass, while in the second four grinding units C said end yokes 174 of the arms 106 are located beneath the sheet 25. The abrasive belts 30 of these units will accordingly act first upon the upper longitudinal corners 36 of the longer sides as indicated at 28 and 29 in Fig. 4, and subsequently on the lower longitudinal corners indicated therein at 37.

In actual production, an edge treating or seaming apparatus, of the character herein described, has proven very efficient and the glass sheets, acted upon, are satisfactorily finished for subsequent operations. While the edge corners are not ground in the ordinary meaning to have a smooth surface as provided by the usual grinding wheels, the corners are suitably rounded and smoothed off for use of the glass sheets in enclosed areas where said sheets are installed in or covered by framing panels. This apparatus may therefore be used advantageously to prepare glass sheets of rather large dimension and/or irregular pattern such as are ultimately installed as front or rear vehicle windows; the glass sheet being adapted for tempering, or otherwise suitably treated to be included as a type of laminated safety glass.

The glass sheets, as received from pattern cutting tables, are placed on the loading conveyor D and sequentially moved into the first edging section A of the edge treating apparatus. Due to the novel construction of the edging units C, the upper longitudinal corners are alternately acted upon by the grinding belts 30 carried thereon. By changing the related positions of the parts of the edging units C; namely, the motor frame 105 and the support arm 106 with reference to the carrier cradle 104, said unit is adapted to operate on the upper and lower corners of one side or the other of the glass sheet with equal facility. In instances of irregular pattern shape wherein the ends of the glass sheet are disposed at an angle, other than a right angle to the sides of the sheet, the mode of supporting the edge treating units permits them to present the abrasive surface of the grinding belts against these end surfaces so that said belts will flex laterally and follow the glass when the angular line thereof would normally move out of contact with the belt. Reaching the end of the first edge treating section A, the sheets are caused to move transversely so that their remaining sides are presented to the edge treating units. As herein described, the glass sheets may be transferred between the sections of the apparatus by changing the direction of their movement or each sheet may be simply turned by suitable means and continue in a straight line of movement from the first to the second edge treating section.

In the second section B of the apparatus, the abrasive belts of the edge treating units are initially positioned with reference to the approaching glass sheet so as to engage the same in its leading corner areas, as indicated at 39 in Fig. 3, and then to follow the longitudinal side contours to the rear corner areas. The edge treating units will thus automatically present the abrasive surfaces in a manner as to begin at and practically overlap the corner areas finished by the grinding elements of the first section of the apparatus. At the end of the second edge treating section, the glass sheets will be received on the conveyer F for further processing in satisfactory condition of edge finish.

Preferably, although not shown, the edge treating units of each section of the apparatus are located in suitable enclosures to prevent the resulting waste particles of both the glass and the abrasive belts from scattering into the surrounding areas and creating an objectionably contaminated air or surface condition.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for treating the edges of sheets or plates, means for conveying a sheet to be edge treated along a predetermined path, a flexible endless belt having a normally flat straight working run provided with an abrasive surface and positioned in and at one side of the path of travel of said sheet with the length of said run lying in a plane at an angle to the plane of said path of travel and the width of said run lying normally diagonally of said path and with its abrasive surface at an acute angle to said side of said path in the plane thereof, a pair of spaced pulleys over which said belt is trained to support the same, and means for rotating one of said pulleys to drive the belt.

2. In apparatus for treating the edges of sheets or plates, means for conveying a sheet to be edge treated along a predetermined path, a flexible endless belt having a normally flat straight working run provided with an abrasive surface and positioned in and at one side of the path of travel of said sheet with the length of said run lying in a plane normally at an angle to the plane of said path of travel and the width of said run lying diagonally of said path and with its abrasive surface at an acute angle to said side of said path in the plane thereof, a pair of spaced pulleys over which said belt is trained to support the same, means for rotatably carrying said pulleys, means for supporting said carrying means for swinging movement in the plane of the path of travel of the sheet, means for mounting said supporting means for reciprocatory movement toward and away from the path of travel of said sheet, and means for rotating one of said pulleys to drive said belt.

3. In apparatus for treating the edges of sheets or plates, means for conveying a sheet to be edge treated along a predetermined path, a flexible endless belt having a normally flat straight working run provided with an abrasive surface and positioned in and at one side of the path of travel of said sheet with the length of said run lying in a plane normally at an angle to the plane of said path of travel and the width of said run lying diagonally of said path and with its abrasive surface at an acute angle to said side of said path in the plane thereof, a pair of spaced pulleys over which said belt is trained to support the same, means for rotatably carrying said pulleys, means for supporting said carrying means for swinging movement in the plane of the path of travel of the sheet, resilient means for retarding said swinging movement of said carrying means, means for mounting said supporting means for reciprocatory movement toward and away from the path of travel of said sheet, and means carried by said supporting means for rotating one of said pulleys to drive said belt.

4. In apparatus for treating the edges of sheets or plates, means for conveying a sheet to be edge treated along a predetermined path, a flexible endless belt having a normally flat straight working run provided with an abrasive surface and positioned in and at one side of the path of travel of said sheet with the length of said run lying in a plane at an angle to the plane of said path of travel and the width of said run lying normally diagonally of said path and with its abrasive surface at an acute angle to said side of said path in the plane thereof, a pair of spaced pulleys over which said belt is trained to support the same, a support arm, means for mounting said pulleys for rotary movement on said arm, a frame supporting said arm, a cradle for carrying said frame, means for mounting said frame on said cradle and for swinging movement in the plane of the path of travel of the sheet, means for supporting said cradle for reciprocating movement toward and away from said sheet, and means carried by said frame for rotating one of said pulleys to drive said belt.

5. In apparatus for treating the edges of sheets or plates, a conveyor in the form of a plurality of horizontally aligned rolls for carrying a sheet to be edge treated along a definite horizontal path and including rolls of lesser length than the others to form an open areaway in the length of said conveyor, a flexible endless belt having an abrasive surface and a working run positioned in said areaway in and at one side of the path of travel of the said sheet with the length of said run lying in a plane at an angle to the plane of said path of travel and the width of said run lying diagonally of said path and with its abrasive surface facing toward the path at an acute angle to said side of said path in the plane thereof, a pair of spaced pulleys over which said belt is trained to support the same, and means for rotating one of said pulleys to drive the belt.

6. In apparatus for treating the edges of sheets or plates, means for conveying a sheet to be edge treated along a predetermined path, a flexible endless belt having a normally flat straight working run provided with an abrasive surface and positioned in the path of travel of the edge to be treated with the length of said run at an angle to the plane of said sheet and the width of said run normally diagonally of said path and with its abrasive surface at an acute angle to the outside of said edge, a pair of spaced pulleys over which said belt is trained to support the same, means for rotating one of said pulleys to drive the belt, rollers mounted above said conveying means, and means for resiliently urging said rollers toward said conveying means to clamp said sheet therebetween and prevent shifting thereof on said conveying means during operative contact of said belt with said sheet.

7. In apparatus for treating the edges of sheets or plates, means for conveying a sheet to be edge treated along a substantially straight horizontal path, a plurality of flexible endless belts positioned at either side of said conveying means, each of said belts having a normally flat straight working run provided with an abrasive surface and positioned in and at one side of the path of travel of said sheet with the length of said run lying in a plane at an acute angle to the horizontal and the width of said run lying normally diagonally of said path and with its abrasive surface facing and at an acute angle in the horizontal to said side of said path, pairs of spaced pulleys over which said belts are trained to support the same, means for rotating one of the pulleys of each pair to drive the belt, and means for holding said sheet against lateral movement on said conveyor means during operative contact of said belts with said sheet.

8. In apparatus for treating the edges of sheets or plates, means for conveying a sheet to be edge treated along a substantially straight horizontal path, a second means for conveying a sheet to be edge treated along a substantially straight horizontal path arranged in end to end relation and at an angle to said first conveyor, a plurality of flexible endless belts positioned at either side of said conveying means along their lengths, each of said belts having a working run provided with an abrasive surface and positioned in and at one side of the path of travel of said sheet with the length of said run lying in a plane at an angle to the horizontal and the width of said run lying diagonally of said path and with its abrasive surface facing and at an acute angle in the horizontal to said side of said path, pairs of spaced pulleys over which said belts are trained to support the same, means for rotating one of the pulleys of each pair to drive the belt, and means located between the exit end of one of said conveyor means and the entrance end of the other for receiving said sheet from one of said conveyor means and changing its direction of movement to cause it to pass to said other conveyor means.

9. In apparatus for treating the edges of sheets or plates, an L-shaped conveyor comprising a first conveyor section and a second conveyor section, means for driving said conveyor sections to move a sheet to be treated along straight horizontal paths at substantially right angles to one another, a plurality of flexible endless belts positioned at either side of said conveying means each of said belts having a working run provided with an abrasive surface and positioned in and at one side of the path of travel of said sheets with the length of said run lying at an acute angle to the horizontally and the width of said run lying diagonally of said path and with its abrasive surface facing and at an acute angle in the horizontal to said side of said path, pairs of spaced pulleys over which said belts are trained to support the same, means for rotating one of the pulleys of each pair to drive the belt, and means at the juncture of said first and second conveyor sections for receiving said sheet from said first conveyor section changing its direction of movement 90 degrees and directing it to said second conveyor section.

10. In apparatus for treating the edges of sheets or plates, means for conveying a sheet to be edge treated along a substantially straight horizontal path, a plurality of flexible endless belts positioned in staggered relation to one another at either side of said conveying means to alternately grind first one side edge and then an opposite one during movement of said sheet over the conveyor, each of said belts having a working run provided with an abrasive surface and positioned in and at one side of the path of travel of said sheet with the length of said run lying at an angle to the horizontal and its abrasive surface facing the top of said path and with the width of said run lying diagonally of said path and with its abrasive surface facing and at an acute angle in the horizontal to said side of said path, certain other of said belts having the length of their working runs lying in a plane at an acute angle to and with its abrasive surface facing the bottom of said path, pairs of spaced pulleys over which said belts are trained to support the same, means for rotating one of the pulleys of each pair to drive the belt, and roller means for holding said sheet against said conveyor to prevent lateral movement thereof during operative contact of said belts with said sheet.

11. In apparatus for treating the edges of sheets or plates, means for conveying a sheet to be treated along a definite horizontal path, edge treating means comprising an endless abrasive belt, a pair of spaced pulleys over which said belt is trained and that are arranged one above and one below the path of travel of said sheet with one of said pulleys being inwardly of said path and the other outwardly of said path a distance sufficient to cause a run of said belt adjacent said path to lie in and at one side of the path, means for rotatably mounting said pulleys in said positions and with their axes diagonally of said path to present said adjacent run of said belt at an acute angle to and facing up said path and means for rotating one of said pulleys.

GERALD WHITE.

References Cited in the file of this patent

UNITED STATES PATENTS

| Number | Name | Date |
|---|---|---|
| 300,844 | Casey | June 24, 1884 |
| 968,726 | Wysong | Aug. 30, 1910 |
| 1,136,146 | Krohm et al. | Apr. 20, 1915 |
| 1,198,136 | Ladd | Sept. 12, 1916 |
| 1,356,338 | Clarke | Oct. 19, 1920 |
| 1,365,583 | Brown | Jan. 11, 1921 |
| 1,396,535 | Laird | Nov. 8, 1921 |
| 1,453,175 | Perrault | Apr. 24, 1923 |
| 1,519,425 | Walker et al. | Dec. 16, 1924 |
| 1,554,804 | Fox | Sept. 22, 1925 |
| 1,797,342 | Hitchcock | Mar. 24, 1931 |
| 1,827,839 | Derryberry | Oct. 20, 1931 |
| 1,900,939 | Kinney | Mar. 14, 1933 |
| 1,907,446 | Schick et al. | May 9, 1933 |
| 2,009,452 | Moomaw | July 30, 1935 |
| 2,272,651 | Waldron et al. | Feb. 10, 1942 |
| 2,331,157 | Arey | Oct. 5, 1943 |
| 2,479,506 | Payton | Aug. 16, 1949 |
| 2,489,811 | Perkins | Nov. 29, 1949 |

FOREIGN PATENTS

| Number | Country | Date |
|---|---|---|
| 206,234 | Germany | Oct. 29, 1907 |